(12) United States Patent
Kataoka (10) Patent No.: US 11,194,590 B2
(45) Date of Patent: Dec. 7, 2021

(54) ELECTRONIC APPARATUS AND METHOD

(71) Applicant: TOSHIBA TEC KABUSHIKI KAISHA, Tokyo (JP)

(72) Inventor: Mitsuhiro Kataoka, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/083,339

(22) Filed: Oct. 29, 2020

(65) Prior Publication Data

US 2021/0279071 A1 Sep. 9, 2021

(30) Foreign Application Priority Data

Mar. 6, 2020 (JP) .............................. JP2020-039312

(51) Int. Cl.
   *G06F 9/4401* (2018.01)
   *G06F 13/12* (2006.01)
   *G06F 13/42* (2006.01)

(52) U.S. Cl.
   CPC .......... *G06F 9/4415* (2013.01); *G06F 13/126* (2013.01); *G06F 13/426* (2013.01)

(58) Field of Classification Search
   None
   See application file for complete search history.

(56) References Cited

U.S. PATENT DOCUMENTS

2008/0126628 A1* 5/2008 Mullis ................. G06F 13/4282
   710/63
2018/0314661 A1* 11/2018 Douthat ............. G06F 13/4282

FOREIGN PATENT DOCUMENTS

JP        2006-180356        7/2006

* cited by examiner

*Primary Examiner* — Farley Abad
*Assistant Examiner* — Dayton Lewis-Taylor
(74) *Attorney, Agent, or Firm* — Amin, Turocy & Watson, LLP (57) ABSTRACT

According to one embodiment, an electronic apparatus includes a connection unit configured to be capable of being connected to a host device, a storage unit configured to store device classes of a plurality of types, a processing unit configured to execute processing for establishing communication with the host device connected to the connection unit by selectively using one device class from among the device classes stored in the storage unit, and a processing control unit configured to change the device class to be used for the processing by the processing unit if a message appropriate for the selected device class is not transmitted from the host device.

17 Claims, 6 Drawing Sheets

| PRIORITY | DEVICE CLASS |
|---|---|
| 1 | CLASS C1 |
| 2 | CLASS C2 |

ELECTRONIC APPARATUS AND METHOD

CROSS-REFERENCE TO RELATED APPLICATION

This application is based upon and claims the benefit of priority from Japanese Patent Application No. 2020-039312, filed on Mar. 6, 2020, the entire contents of which are incorporated herein by reference.

FIELD

Embodiments described herein relate generally to an electronic apparatus and a method.

BACKGROUND

In recent years, in host devices such as a PC or a POS terminal, various electronic apparatuses (USB devices) are connected to each other through a universal serial bus (USB) connector. In a host device, a connected USB device can be used as a peripheral apparatus by introducing a device driver corresponding to a device class of the USB device. Specifically, it is possible to use a USB device in a host device by performing processing for establishing communication called enumeration between the host device and the USB device.

Incidentally, in a host device, a device driver to be introduced may be restricted due to various reasons. If the device driver of the host device does not correspond to a device class of a USB device, the host device cannot use the USB device.

In recent years, there is also a USB device which is operable according to a desired device class by adopting a configuration in which one device class can be manually selected from among a plurality of device classes.

However, in the above-described technique of the related art, it is necessary to manually select a device class, which results in problems of a complicated operation and lack of convenience.

DETAILED DESCRIPTION

A problem to be solved by an exemplary embodiment is to provide an electronic apparatus capable of automatically switching a device class in accordance with specifications of a host device, and a method.

An electronic apparatus of an exemplary embodiment includes a connection unit configured to be capable of being connected to a host device, a storage unit configured to store device classes of a plurality of types, a processing unit configured to execute processing for establishing communication with the host device connected to the connection unit by selectively using one device class from among the device classes stored in the storage unit, and a processing control unit configured to change the device class to be used for the processing by the processing unit if a message appropriate for the selected device class is not transmitted from the host device.

Hereinafter, an electronic apparatus and a method according to an exemplary embodiment will be described with reference to the accompanying drawings. Meanwhile, an exemplary embodiment is not limited by the exemplary embodiment to be described below.

Figure 1:
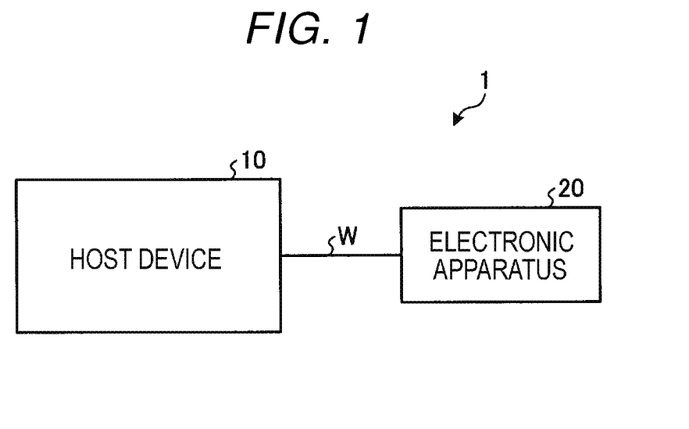
FIG. 1 is a diagram showing an example of a configuration of an information processing system according to an exemplary embodiment.

FIG. 1 is a diagram showing an example of a configuration of an information processing system according to the exemplary embodiment. As shown in FIG. 1, an information processing system 1 includes a host device 10 and an electronic apparatus 20.

The host device 10 is an information processing apparatus such as a personal computer (PC) or a point of sale system (POS) terminal.

On the other hand, the electronic apparatus 20, which is an example of an electronic apparatus, is any of various USB devices based on a universal serial bus (USB) standard. For example, the electronic apparatus 20 may be a code scanner device for reading a code symbol such as a bar code or may be a printer device for printing a receipt or the like.

The electronic apparatus 20 is connected to the host device 10 through a USB cable W. When the electronic apparatus 20 is connected, the host device 10 executes processing for establishing communication called enumeration with the electronic apparatus 20. Then, the normal completion of the enumeration leads to a state where the electronic apparatus 20 can be used in the host device 10.

Figure 2:
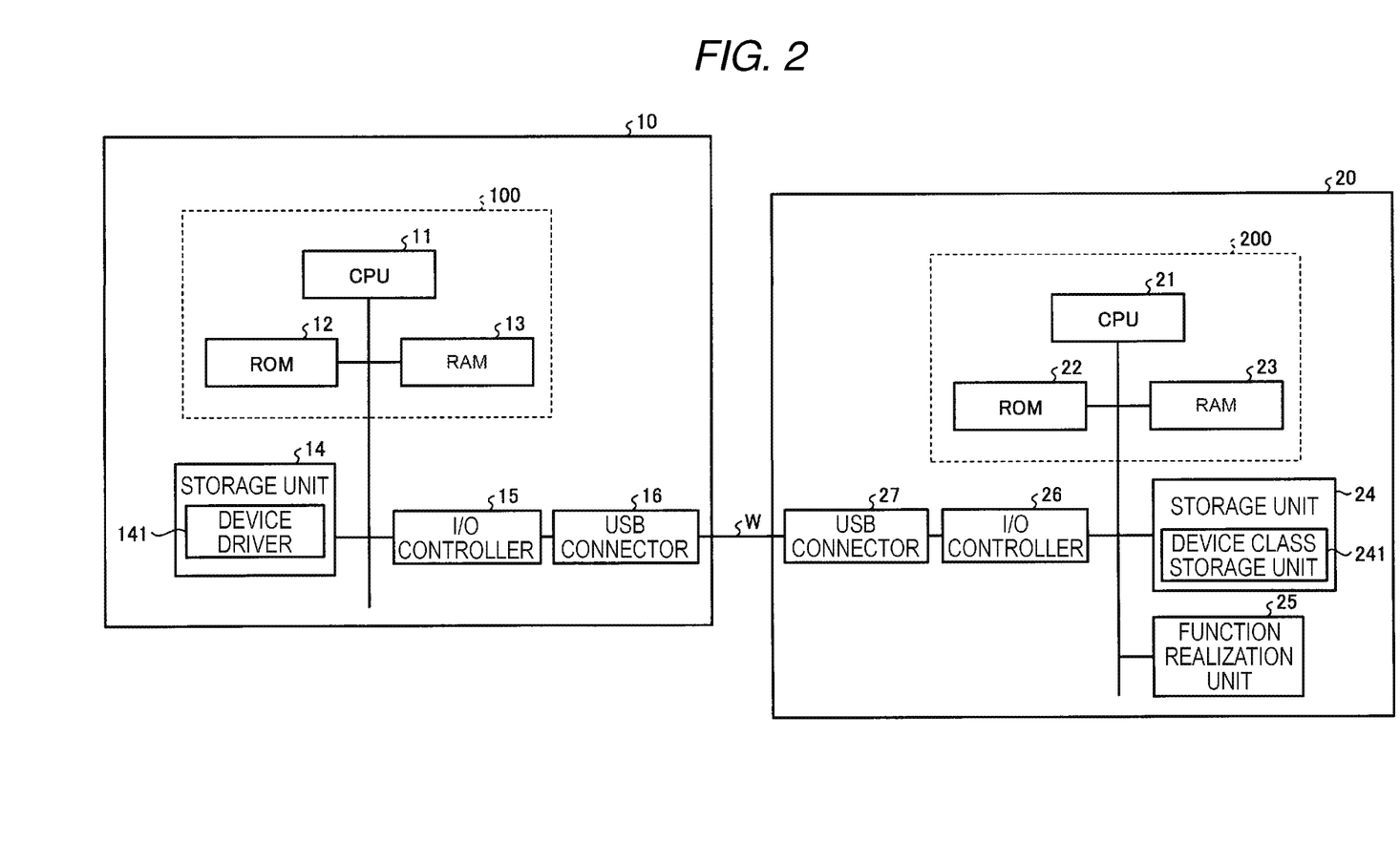
FIG. 2 is a diagram showing an example of hardware configurations of a host device and an electronic apparatus.

Next, hardware configurations of the host device 10 and the electronic apparatus 20 described above will be described. FIG. 2 is a diagram showing an example of the hardware configurations of the host device 10 and the electronic apparatus 20.

As shown in FIG. 2, the host device 10 includes a CPU 11, a ROM 12 and a RAM 13. The CPU 11 is an example of a processor and generally controls the operation of the host device 10. The ROM 12 stores various programs. The RAM 13 is used as a working memory for developing various data.

The CPU 11, the ROM 12, and the RAM 13 are connected to each other through a bus or the like and constitute a control unit 100. The control unit 100 executes various processes by the CPU 11 operating in accordance with a program stored in the ROM 12 or a storage unit 14 to be described later.

The storage unit 14 is connected to the control unit 100 through a bus or the like. The storage unit 14 is constituted by a non-volatile memory such as a hard disk drive (HDD) or a solid state drive (SSD) which stores storage information even if a power supply is turned off.

The storage unit 14 stores an operating system (OS), various programs, setting information, and the like. In addition, the storage unit 14 stores a device driver 141. The device driver 141 is software (program) for controlling a USB device corresponding to a specific device class. Meanwhile, the device class will be described later.

The device driver 141 may be a device driver provided in a state where the device driver is assembled in an OS (hereinafter, also referred to as a standard driver). In addition, the device driver 141 may be a vendor-specific device driver which is provided from a vendor of the USB device (hereinafter, also referred to as a vendor driver).

Further, it is assumed that the device class to which the device driver 141 corresponds does not particularly matter. For example, the device class maybe a mass storage class (MSC) or a vendor-specific device class such as an image (scanner) or a printer. In addition, even if USB devices are the same devices, both a standard driver and a vendor driver can also be introduced as the device driver 141 for the device. In this case, different device classes (class codes) are attached to the standard driver and the vendor driver, and control is performed such that any one of the standard driver and the vendor driver is preferentially used (for example, the vendor driver).

In addition, an I/O controller 15 equipped with a USB controller is connected to the control unit 100 through a bus or the like. A USB connector 16 is connected to the I/O controller 15. The I/O controller 15 controls the transmission and reception of a signal through the USB connector 16.

On the other hand, the electronic apparatus 20 includes a CPU 21, a ROM 22, and a RAM 23 as shown in FIG. 2. The CPU 21 is an example of a processor and generally controls the operation of the electronic apparatus 20. The ROM 22 stores various programs. The RAM 23 is used as a working memory for developing various data.

The CPU 21, the ROM 22, and the RAM 23 are connected to each other through a bus or the like and constitute a control unit 200. The control unit 200 executes various processes by the CPU 21 operating in accordance with a program stored in the ROM 22 or a storage unit 24 to be described later.

The storage unit 24 and a function realization unit 25 are connected to the control unit 200 through a bus or the like. The storage unit 24, which is an example of a storage unit, is constituted by a non-volatile memory such as a flash memory that stores storage information even if a power supply is turned off.

The storage unit 24 stores an assembled OS, various programs, setting information, and the like. In addition, the storage unit 24 includes a device class storage unit 241 that stores device classes of a plurality of types which can be used in its own device.

Figure 3:
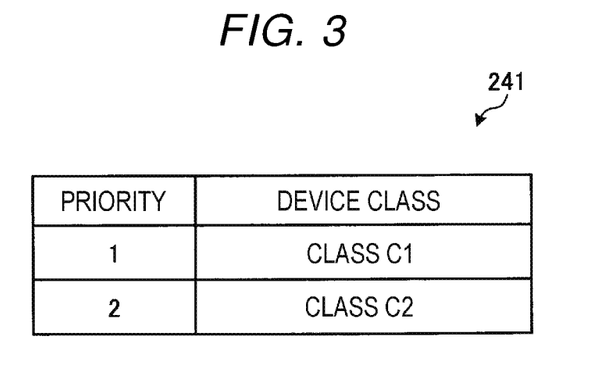
FIG. 3 is a schematic diagram showing an example of a data configuration of a device class storage unit.

FIG. 3 is a schematic diagram showing an example of a data configuration of the device class storage unit 241. As shown in FIG. 3, the device class storage unit 241 stores device classes of a plurality of types which can be used in its own device. Here, the device class means the type and function of a USB device. In more detail, the device class is firmware in which specifications of a device determined for each of USB devices having similar functions and device types, a protocol at the time of establishing communication with the host device 10, and the like are defined.

The device class storage unit 241 shown in FIG. 3 stores device classes of two types, that is, a class C1 and a class C2. Here, the class C1 is a device class corresponding to, for example, a vendor driver of a vendor for manufacturing the electronic apparatus 20, and the class C2 is a device class corresponding to a standard driver.

Further, in the configuration of the device class storage unit 241 shown in FIG. 3, a priority is set in association with each of device classes. Such a priority serves as an index used when the order of selection of a device class is determined in a process to be described later.

Meanwhile, the number of device classes stored in the device class storage unit 241 is not limited to the example shown in FIG. 3 and may be three or more. Further, in FIG. 3, an example in which a priority is set for each of the device classes is described, but a configuration in which a priority is not provided may be adopted.

Referring back to FIG. 2, the function realization unit 25 is a hardware configuration for realizing the operation and function of the electronic apparatus 20. For example, if the electronic apparatus 20 is a code scanner device, the function realization unit 25 corresponds to a laser scanner device, an imaging device, or the like for reading a code symbol. In addition, for example, if the electronic apparatus 20 is a printer device, the function realization unit 25 corresponds to a printer engine of a thermal transfer type or the like, a conveyance mechanism that conveys paper, or the like.

In addition, an I/O controller 26 equipped with a USB controller is connected to the control unit 200 through a bus or the like. A USB connector 27 which is an example of a connection unit is connected to the I/O controller 26. The I/O controller 26 controls the transmission and reception of a signal through the USB connector 27.

As shown in FIG. 2, the host device 10 and the electronic apparatus 20 are connected to each other by connecting the USB connector 16 and the USB connector 27 of the electronic apparatus 20 to each other through the USB cable W. If the electronic apparatus 20 is connected to the host device 10, the host device 10 starts enumeration for establishing communication with the electronic apparatus 20.

Specifically, if the electronic apparatus 20 is connected, the control unit 100 of the host device 10 determines a device class of the connected electronic apparatus 20 by acquiring a class code indicating a device class from the electronic apparatus 20 through the I/O controller 15. If the device class of the electronic apparatus 20 corresponds to a device class of the device driver 141 introduced into its own device, the control unit 100 determines that the electronic apparatus 20 can be recognized. In this case, the control unit 100 establishes communication with the electronic apparatus 20 by transmitting a message such as a command appropriate for the device class of the electronic apparatus 20 to the electronic apparatus 20 in cooperation with the device driver 141. Thereby, in the host device 10, the electronic apparatus 20 connected to the USB connector 16 can be used as a peripheral apparatus.

On the other hand, if the device class of the electronic apparatus 20 does not correspond to the device class of the device driver 141, the control unit 100 determines that the electronic apparatus 20 cannot be recognized and stops (terminates) the enumeration. If the enumeration is stopped, that is, if the enumeration is not successful, the electronic apparatus 20 cannot be controlled by the host device 10, and thus the electronic apparatus 20 cannot be used as a peripheral apparatus.

Incidentally, in the host device 10, the device driver 141 to be introduced may be limited for various reasons. For example, a vendor driver cannot be introduced for security reasons or the like, and there is also a host device capable of using only a standard driver equipped in an OS. If the device driver 141 of the host device 10 does not correspond to a device class of a USB device, the host device 10 cannot use the USB device. Consequently, for example, it is conceivable that a USB device is operated by a desired device class by adopting a configuration in which one device class can be manually selected from among a plurality of device classes.

However, in the above-described configuration, it is necessary to manually select a device class in accordance with specifications of the host device 10, which results in problems of a complicated operation and lack of convenience.

Consequently, the electronic apparatus 20 of the present exemplary embodiment has a function for efficiently performing enumeration with the host device 10 with respect to the above-described problems. Hereinafter, a functional configuration of the electronic apparatus 20 will be described with reference to FIG. 4.

Figure 4:
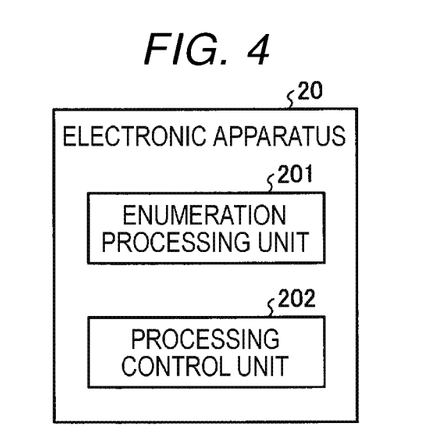
FIG. 4 is a diagram showing an example of a functional configuration of the electronic apparatus.

FIG. 4 is a diagram showing an example of a functional configuration of the electronic apparatus 20. As shown in FIG. 4, the electronic apparatus 20 includes an enumeration processing unit 201 and a processing control unit 202 as functional units.

Some or all of the functional units included in the electronic apparatus 20 may have a software configuration realized by cooperation between a processor (for example, the CPU 21) of the electronic apparatus 20 and a program stored in a memory (for example, the ROM 22 and the storage unit 24). In addition, some or all of the functional units included in the electronic apparatus 20 may have a hardware configuration realized by a dedicated circuit or the like mounted on the electronic apparatus 20.

The enumeration processing unit 201 is an example of a processing unit and processing means. The enumeration processing unit 201 performs enumeration with the host device 10 connected to the USB connector 27 by selectively using one device class from among the device classes of a plurality of types stored in the device class storage unit 241. In addition, the enumeration processing unit 201 performs enumeration with the host device 10 while switching a device class to be used for the enumeration under the control of the processing control unit 202.

In the enumeration, the enumeration processing unit 201 transmits a class code indicating the selected device class to the host device 10 in response to a request received from the host device 10. Then, if a message appropriate for the selected device class is transmitted from the host device 10, the enumeration processing unit 201 establishes communication with the host device 10 on the basis of a protocol specified in the device class. Thereafter, the electronic apparatus 20 operates as a peripheral apparatus of the host device 10.

Meanwhile, the order of selection of a device class from the device class storage unit 241 is not particularly limited, and a device class may be selected in the order of storage or selected randomly. In addition, as shown in FIG. 3, a device class may be selected on the basis of a priority which is set for each of the device classes.

The processing control unit 202 is an example of a processing control unit and unit configured to control the process. If enumeration with the host device 10 is not successful, the processing control unit 202 performs control for changing a device class to be used for the enumeration by controlling the enumeration processing unit 201. Specifically, after enumeration with the host device 10 is started, the processing control unit 202 performs control for changing a device class if a message appropriate for a selected device class is not transmitted from the host device 10.

For example, if a message appropriate for a device class is not transmitted within a predetermined period of time (hereinafter, also referred to as a waiting time) after enumeration is started, the processing control unit 202 determines that the enumeration is not successful. In this case, the processing control unit 202 cuts off electrical connection to the host device 10 and controls the enumeration processing unit 201 so that a device class to be used for enumeration is changed to another device class. Then, the processing control unit 202 connects the host device 10 again after changing a device class so that the enumeration processing unit 201 executes enumeration again in accordance with the changed device class.

Here, a method of cutting off connection to the host device 10 and connecting the host device 10 again does not particularly matter, and various methods can be used. For example, the processing control unit 202 may be configured to perform the cutoff of connection and reconnection between the host device 10 and its own device by stopping the supply of power and supplying power to the USB connector 27. In addition, the processing control unit 202 may be configured to perform the cutoff of connection and reconnection between the host device 10 and its own device by pulling down and pulling up a D+ terminal or the like including the USB connector 27. In addition, the waiting time can be arbitrarily set to, for example, 3 seconds or the like.

Figure 5:
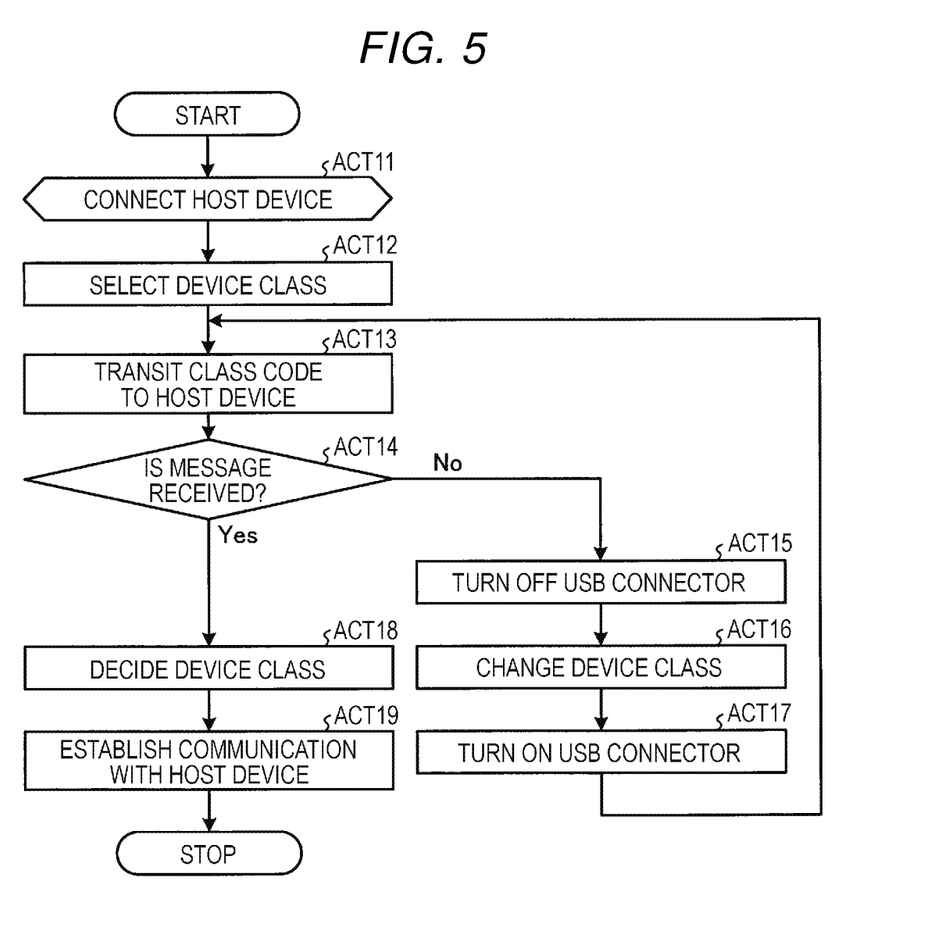
FIG. 5 is a flowchart showing an example of processing performed by the electronic apparatus.

Hereinafter, operations of the electronic apparatus 20 described above will be described. FIG. 5 is a flowchart showing an example of processing executed by the electronic apparatus 20.

When the host device 10 is connected to the USB connector 27 (ACT 11), the enumeration processing unit 201 selects one device class from among the device classes of a plurality of types stored in the device class storage unit 241 (ACT 12). For example, the enumeration processing unit 201 selects a device class having the highest priority.

Subsequently, the enumeration processing unit 201 starts enumeration with the host device 10 and transmits a class code of the device class selected in ACT 12 to the host device 10 in response to a request received from the host device 10 (ACT 13). Subsequently, the processing control unit 202 determines whether or not a message appropriate for the device class is received within a predetermined waiting time after the class code is transmitted (ACT 14).

Here, if a message cannot be received from the host device 10 within the waiting time (ACT 14; No), the processing control unit 202 cuts off electrical connection to the host device 10 by turning off the USB connector 27 (ACT 15). Subsequently, the processing control unit 202 controls the enumeration processing unit 201 so as to change the device class to another device class (ACT 16).

For example, the enumeration processing unit 201 selects a device class having the next priority in response to an instruction received from the processing control unit 202. Meanwhile, if a device class having the lowermost priority is selected, the enumeration processing unit 201 may select a device class having the uppermost priority in response to an instruction received from the processing control unit 202.

Then, the processing control unit 202 connects the host device 10 by turning on the USB connector 27 after changing the device class (ACT 17), and then causes the processing to return to ACT 13. Thereby, the enumeration processing unit 201 starts enumeration with the host device 10 on the basis of the changed device class in ACT 13.

Meanwhile, the processing control unit 202 may be configured to count the number of times ACT 16 is performed, that is, the number of times a device class is changed, and to forcibly terminate processing if the number of times reaches a threshold value (a predetermined number of times). In this case, the threshold value is set to be a value obtained by subtracting 1 from the number of device classes stored in the device class storage unit 241, so that it is possible to attempt enumeration according to all of the device classes stored in the device class storage unit 241. In addition, the processing control unit 202 may give a notification indicating that the device class of its own device is not appropriate for the host device 10 at a timing when the counted number of times reaches the threshold value. In this case, a notification method does not particularly matter, and a notification may be given using a sound output apparatus such as a buzzer, a displayer (not shown), or the like included in the electronic apparatus 20.

On the other hand, in ACT 14, when the message is received within the waiting time (ACT 14; Yes), the processing control unit 202 decides the device class selected in ACT 12 (ACT 18). Then, the enumeration processing unit 201 executes processing for establishing communication with the host device 10 on the basis of a protocol specified in the selected device class (ACT 19).

Through the above-described processing, the electronic apparatus 20 performs enumeration with the host device 10 while switching a device class. Then, if the selected device class is appropriate for the device driver 141 introduced into the host device 10, the electronic apparatus 20 establishes communication with the host device 10 using the selected device class.

Figure 6:
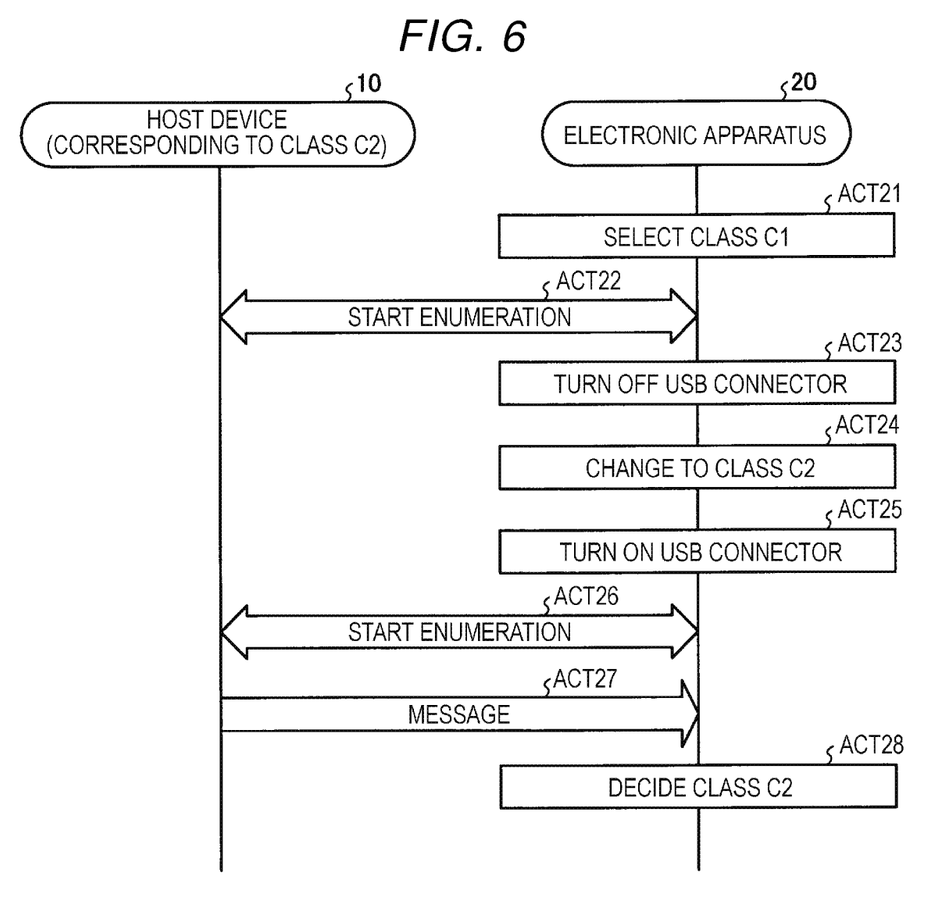
FIG. 6 is a sequence diagram showing an example of operations performed between the host device and the electronic apparatus.
Figure 7:
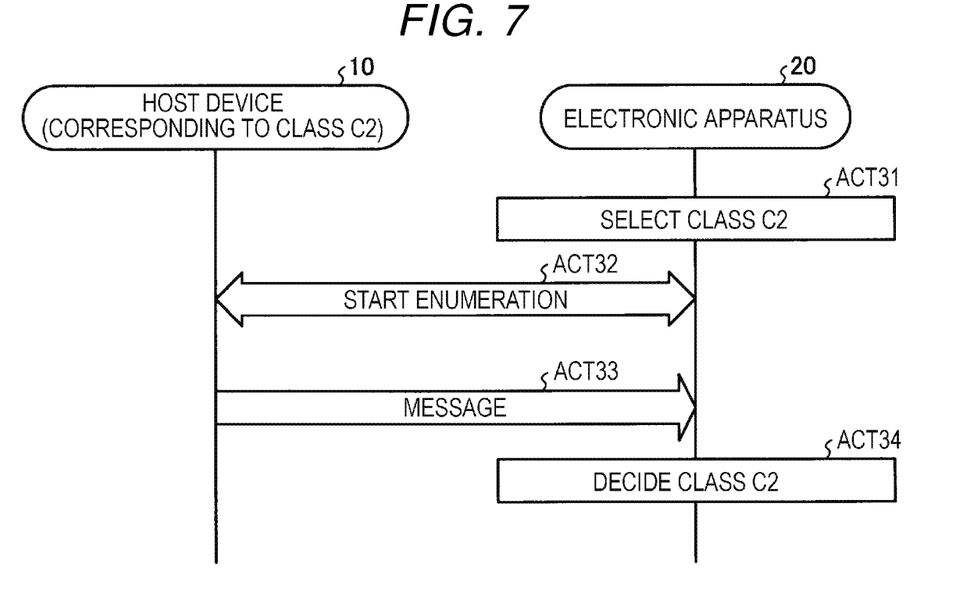
FIG. 7 is a sequence diagram showing an example of operations performed between the host device and the electronic apparatus.

Next, operation examples of the host device 10 and the electronic apparatus 20 will be described with reference to FIGS. 6 and 7. Here, FIGS. 6 and 7 are sequence diagrams showing an example of operations performed between the host device 10 and the electronic apparatus 20.

Meanwhile, hereinafter, an operation example if the electronic apparatus 20 corresponds to the device classes of the "class C1" and the "class C2" shown in FIG. 3 and the device driver 141 corresponding to the "class C2" is introduced into the host device 10 will be described.

First, an operation example (first operation example) if the electronic apparatus 20 first selects the "class C1" will be described with reference to FIG. 6.

When the host device 10 and the electronic apparatus 20 are connected to each other, the enumeration processing unit 201 of the electronic apparatus 20 selects the "class C1" from the device classes stored in the device class storage unit 241 (ACT 21). Subsequently, the enumeration processing unit 201 starts enumeration with the host device 10 by performing processing for transmitting a class code indicating the "class C1" to the host device 10, or the like in response to a request from the host device 10 (ACT 22).

In this case, in the host device 10, the class code "class C1" acquired from the electronic apparatus 20 does not correspond to the device driver 141 introduced into its own device, and thus it is determined that the device is an obscure device that cannot be treated in its own device. For this reason, the host device 10 terminates the enumeration without transmitting a message appropriate for the "class C1" to the electronic apparatus 20.

On the other hand, the processing control unit 202 of the electronic apparatus 20 waits for a message from the host device 10 after the enumeration is started in ACT 22. Here, if a message is not transmitted within a waiting time, the processing control unit 202 switches the USB connector 27 to an off state (ACT 23).

Subsequently, the processing control unit 202 controls the enumeration processing unit 201 so as to change the device class used for enumeration to the "class C2" (ACT 24), and then switches the USB connector 27 to an on state (ACT 25). Thereby, the host device 10 and the electronic apparatus 20 are set to be in a connected state again.

After the host device 10 is reconnected, the enumeration processing unit 201 transmits a class code indicating the "class C2" to the host device 10 in response to a request from the host device 10 and starts enumeration with the host device 10 (ACT 26).

In this case, it is determined that the class code "class C2" acquired from the electronic apparatus 20 corresponds to the device driver 141 introduced into its own device in the host device 10, and thus a message appropriate for the "class C2" is transmitted to the electronic apparatus 20 (ACT 27).

After enumeration is started in ACT 26, the processing control unit 202 of the electronic apparatus 20 waits for a message from the host device 10. Then, when a message is received within a waiting time, the processing control unit 202 decides the "class C2" (ACT 28) and continues enumeration based on the "class C2".

Next, an operation example (second operation example) if the electronic apparatus 20 first selects the "class C2" will be described with reference to FIG. 7.

When the host device 10 and the electronic apparatus 20 are connected to each other, the enumeration processing unit 201 of the electronic apparatus 20 selects the "class C2" from the device classes stored in the device class storage unit 241 (ACT 31). Subsequently, the enumeration processing unit 201 starts enumeration with the host device 10 by performing processing for transmitting a class code indicating the "class C2" to the host device 10 in response to a request received from the host device 10, or the like (ACT 32).

In this case, it is determined that the class code "class C2" acquired from the electronic apparatus 20 corresponds to the device driver 141 introduced into its own device in the host device 10, and thus a message appropriate for the "class C2" is transmitted to the electronic apparatus 20 (ACT 33).

After enumeration is started in ACT 32, the processing control unit 202 of the electronic apparatus 20 waits for a message from the host device 10. Then, if a message is received within a waiting time, the processing control unit 202 decides the "class C2" (ACT 34) and continues enumeration based on the "class C2".

As described above, the electronic apparatus 20 executes enumeration for establishing communication with the host device 10 by selectively using one device class from among the device classes of a plurality of types stored in the device class storage unit 241. Further, if a message appropriate for the selected device class is not transmitted from the host device 10, the electronic apparatus 20 changes a device class to be used for enumeration and executes enumeration again according to the changed device class.

Thereby, in the electronic apparatus 20, it is possible to attempt enumeration with the host device 10 while automatically switching a device class until the electronic apparatus 20 conforms to the specifications (device driver 141) of the host device 10. Accordingly, in the electronic apparatus 20, it is possible to automatically switch a device class in accordance with the specifications of the host device 10. Further, in the electronic apparatus 20, it is possible to automatically select (set) a device class appropriate for the specifications of the host device 10 without manually selecting a device class, and thus enumeration with the host device 10 can be efficiently performed.

Further, in the electronic apparatus 20, connection to the host device 10 is cut off prior to the change of a device class, and the host device 10 is connected again after a device class is changed. Thereby, in the electronic apparatus 20, enumeration can be executed again according to the changed device class without taking out and putting in the USB cable W, and thus it is possible to efficiently establish communication with the host device 10.

The above-described exemplary embodiment can also be appropriately modified and implemented by changing some of the configurations or functions of the electronic apparatus 20 described above. Consequently, hereinafter, some modification examples according to the above-described exemplary embodiment will be described as other exemplary embodiments. Meanwhile, hereinafter, differences from the above-described exemplary embodiment will be mainly described, and detailed description of contents in common with the contents described above will be omitted. In addition, modification examples to be described below may be implemented individually or may be implemented in combination as appropriate.

Modification Example 1

In the present modification example, a configuration in which a device class in which the transmission of a message is confirmed in the previous enumeration is preferentially selected in the subsequent processes will be described.

For example, in the first operation example described in FIG. 6, the processing control unit 202 performs a process of deciding the device class "class C2" in which a message from the host device 10 is confirmed in ACT 28. In this case, the processing control unit 202 may perform setting such that the "class C2" is preferentially selected by raising the priority of the "class C2" stored in the device class storage unit 241 to the highest level. Thereby, a device class to be first selected by the enumeration processing unit 201 in the subsequent processes can be set to the "class C2".

By performing the above-described control, the electronic apparatus 20 can perform enumeration by preferentially selecting a device class confirmed to be usable in the host device 10. Thereby, it is possible to achieve a reduction in a period of time required until enumeration is normally completed, and thus it is possible to achieve an improvement in convenience.

Modification Example 2

In the above-described exemplary embodiment, the description is given of a configuration in which a device class is decided by determining that enumeration is normally completed on condition that a message is transmitted from the host device 10. However, depending on the device driver 141 introduced into the host device 10, even if the device driver 141 does not correspond to a device class of the electronic apparatus 20, a message appropriate for the device class may be transmitted.

For example, in a vendor driver that partially reuses the function of a standard driver, a message appropriate for a device class of the standard driver may be transmitted when enumeration is started. However, the standard driver and the vendor driver have different specifications, an error may occur before communication between the host device 10 and the electronic apparatus 20 is established, due to interruption of communication after a message is transmitted.

Consequently, the processing control unit 202 may perform control of changing a device class if communication with the host device 10 cannot be established even if a message is transmitted from the host device 10. Specifically, the processing control unit 202 performs the above-described control for changing a device class if a process of establishing communication with the host device 10 is not completed within a predetermined waiting time after a message is transmitted from the host device 10.

Thereby, in the electronic apparatus 20, it is possible to automatically select (set) a device class in which enumeration with the host device 10 is normally completed, and thus establishment of communication with the host device 10 can be efficiently performed.

Modification Example 3

In the above-described exemplary embodiment, a configuration in which the host device 10 and the electronic apparatus 20 are connected to each other through the USB cable W is described. However, the exemplary embodiment is not limited thereto, and a configuration in which the host device 10 and the electronic apparatus 20 are directly connected to each other may be adopted.

For example, a configuration may be adopted in which the USB connector 16 includes a female terminal of a USB, and the USB connector 27 includes a male terminal of a USB or an opposite terminal, so that the host device 10 and the electronic apparatus 20 can be directly connected to each other.

Programs executed in the respective devices of the above-described exemplary embodiment are provided by being embedded in the ROM or the like in advance. A configuration may be adopted in which the programs executed in the respective devices of the above-described exemplary embodiment are provided by being recorded in a computer-readable recording medium such as a CD-ROM, a flexible disk (FD), a CD-R, or a digital versatile disk (DVD) in a file having an installable format or an executable format.

Further, a configuration may be adopted in which the programs executed in the respective devices of the above-described exemplary embodiment are provided by being stored on a computer connected to a network such as the Internet and being downloaded through the network. In addition, a configuration may be adopted in which the programs executed in the respective devices of the above-described exemplary embodiment are provided and distributed through a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions changes and combination in the form of the embodiments described herein maybe made without departing from the spirit of the inventions. The accompanying claims and their equivalents are intended to cover such forms or modifications as would fall within the scope and spirit of the inventions.

What is claimed is:

1. An electronic apparatus, comprising:
a connection component configured to connect to a host device;
a storage component configured to store device classes of a plurality of types;
a processing component configured to execute processing for establishing communication with the host device connected to the connection component by selectively using one device class from among the device classes stored in the storage component; and
a processing controller configured to change the one device class for the processing by the processing component if a message appropriate for a selected device class is not transmitted from the host device, wherein the processing controller gives a notification if a number of times the one device class is changed reaches a predetermined number of times.

2. The electronic apparatus according to claim 1, wherein the processing controller cuts off the connection between the connection component and the host device prior to the change of the one device class and connects the connection component and the host device to each other again after changing the one device class.

3. The electronic apparatus according to claim 1, wherein the processing controller causes the processing component to preferentially select a device class in subsequent processes, the device class from a message transmitted from the host device in a previous process.

4. The electronic apparatus according to claim 1, wherein the processing controller changes the one device class if communication with the host device is not established even if a message is transmitted from the host device.

5. The electronic apparatus according to claim 1, wherein the connection component comprises a USB cable.

6. The electronic apparatus according to claim 1, wherein the electronic apparatus is a code scanner.

7. The electronic apparatus according to claim 1, wherein the electronic apparatus is a printer.

8. A method of causing a computer of an electronic apparatus including a connection component connectable to a host device to perform functions including:
    executing processing for establishing communication with the host device connected to the connection component by selectively using one device class from among device classes of a plurality of types;
    changing the one device class for the processing if a message appropriate for a selected device class is not transmitted from the host device; and
    generating a notification if a number of times the one device class is changed reaches a predetermined number of times.

9. The method according to claim 8, further comprising:
    cutting off the connection between the connection component and the host device prior to the change of the one device class and connecting the connection component and the host device to each other again after changing the one device class.

10. The method according to claim 8, further comprising:
    generating a notification if a number of times the one device class is changed reaches a predetermined number of times.

11. An electronic system, comprising:
    a host device; and
    an electronic apparatus, comprising:
        a connection component configured to connect to the host device;
        a storage component configured to store device classes of a plurality of types;
        a processing component configured to execute processing for establishing communication with the host device connected to the connection component by selectively using one device class from among the device classes stored in the storage component; and
        a processing controller configured to change the one device class for the processing by the processing component if a message appropriate for a selected device class is not transmitted from the host device, wherein the processing controller gives a notification if a number of times the one device class is changed reaches a predetermined number of times.

12. The electronic system according to claim 11, wherein the processing controller cuts off the connection between the connection component and the host device prior to the change of the one device class and connects the connection component and the host device to each other again after changing the one device class.

13. The electronic system according to claim 11, wherein the processing controller causes the processing component to preferentially select a device class in subsequent processes, the device class from a message transmitted from the host device in a previous process.

14. The electronic system according to claim 11, wherein the processing controller changes the one device class if communication with the host device is not established even if a message is transmitted from the host device.

15. The electronic system according to claim 11, wherein the connection component comprises a USB cable.

16. The electronic system according to claim 11, wherein the host device is a personal computer or POS terminal.

17. The electronic system according to claim 11, wherein the electronic apparatus is a printer or a code scanner.

* * * * *